(12) United States Patent
Gallucci et al.

(10) Patent No.: US 7,652,107 B2
(45) Date of Patent: *Jan. 26, 2010

(54) FLAME RESISTANT POLYMER BLENDS

(75) Inventors: Robert Russell Gallucci, Mt. Vernon, IN (US); William A. Kernick, III, Evansville, IN (US); Mark A. Sanner, Newburgh, IN (US); Rajendra Kashinath Singh, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 452 days.

This patent is subject to a terminal disclaimer.

(21) Appl. No.: 11/263,493

(22) Filed: Oct. 31, 2005

(65) Prior Publication Data

US 2007/0100088 A1 May 3, 2007

(51) Int. Cl.
*C08L 67/00* (2006.01)
*C08L 83/04* (2006.01)
*B32B 27/00* (2006.01)

(52) U.S. Cl. ..................... 525/446; 525/474

(58) Field of Classification Search .................. 525/446, 525/474; 252/601
See application file for complete search history.

(56) References Cited

U.S. PATENT DOCUMENTS

| | | | |
|---|---|---|---|
| 3,087,908 A * | 4/1963 | Caird ..................... | 525/464 |
| 3,189,662 A | 6/1965 | Vaughn, Jr. | |
| 3,325,450 A | 6/1967 | Holub | |
| 3,383,092 A | 5/1968 | Cazier | |
| 3,419,635 A | 12/1968 | Vaughn, Jr. | |
| 3,539,655 A | 11/1970 | Strachan et al. | |
| 3,539,657 A | 11/1970 | Noshay et al. | |
| 3,668,273 A | 6/1972 | Krantz | |
| 3,671,487 A | 6/1972 | Abolins | |
| 3,723,373 A | 3/1973 | Lucas | |
| 3,833,546 A | 9/1974 | Takekoshi et al. | |
| 3,847,867 A | 11/1974 | Heath et al. | |
| 4,011,279 A | 3/1977 | Berger et al. | |
| 4,051,163 A | 9/1977 | Berger | |
| 4,334,053 A | 6/1982 | Freitag et al. | |
| 4,404,350 A | 9/1983 | Ryang | |
| 4,430,484 A * | 2/1984 | Quinn .................... | 525/425 |
| 4,443,581 A | 4/1984 | Robeson et al. | |
| 4,536,590 A * | 8/1985 | Brown, Jr. ............... | 556/453 |
| 4,548,997 A | 10/1985 | Mellinger et al. | |
| 4,687,819 A | 8/1987 | Quinn et al. | |
| 4,690,997 A | 9/1987 | Cella et al. | |
| 4,808,686 A | 2/1989 | Cella et al. | |
| 4,814,392 A | 3/1989 | Shea et al. | |
| 4,816,527 A | 3/1989 | Rock | |
| 4,908,418 A | 3/1990 | Holub | |
| 4,908,419 A | 3/1990 | Holub et al. | |
| 5,028,681 A | 7/1991 | Peters | |
| 5,051,483 A | 9/1991 | Rock et al. | |
| 5,106,915 A | 4/1992 | Rock et al. | |
| 5,357,022 A | 10/1994 | Banach et al. | |
| 5,385,970 A * | 1/1995 | Gallucci et al. ........... | 524/538 |
| 5,387,639 A | 2/1995 | Sybert et al. | |
| 5,418,317 A | 5/1995 | Raymond, III | |
| 5,521,258 A | 5/1996 | Cooper et al. | |
| 5,852,085 A * | 12/1998 | Brown et al. ............. | 524/128 |
| 5,916,997 A | 6/1999 | Webb et al. | |
| 5,986,016 A | 11/1999 | Puyenbroek et al. | |
| 6,011,122 A | 1/2000 | Puyenbroek | |
| 6,072,010 A | 6/2000 | Puyenbroek | |
| 6,072,011 A | 6/2000 | Hoover | |
| 6,143,839 A | 11/2000 | Webb et al. | |
| 6,265,522 B1 | 7/2001 | Brunelle et al. | |
| 6,291,589 B1 | 9/2001 | Brunelle et al. | |
| 6,294,647 B1 | 9/2001 | Brunelle et al. | |
| 6,306,507 B1 | 10/2001 | Brunelle et al. | |
| 6,339,131 B1 | 1/2002 | Cella et al. | |
| 6,545,089 B1 | 4/2003 | DeRudder et al. | |
| 6,559,270 B1 | 5/2003 | Siclovan et al. | |
| 6,627,303 B1 * | 9/2003 | Gallucci et al. .......... | 428/212 |
| 6,657,018 B1 | 12/2003 | Hoover | |
| 6,681,482 B1 | 1/2004 | Lischner et al. | |
| 6,833,422 B2 | 12/2004 | Silva et al. | |
| 2003/0004268 A1 * | 1/2003 | Sundararaj et al. ........ | 525/100 |
| 2007/0066737 A1 * | 3/2007 | Gallucci et al. .......... | 524/430 |

FOREIGN PATENT DOCUMENTS

| | | |
|---|---|---|
| EP | 0307670 B1 | 3/1989 |
| EP | 0519657 A1 | 12/1992 |
| EP | 0704487 A1 | 4/1996 |
| WO | 9410245 A1 | 5/1994 |
| WO | WO94/10245 * | 5/1994 |

OTHER PUBLICATIONS

PCT Search Report for International Application No. PCT/US2006/040774.

(Continued)

*Primary Examiner*—Randy Gulakowski
*Assistant Examiner*—Robert Loewe
(74) *Attorney, Agent, or Firm*—Cantor Colburn LLP

(57) ABSTRACT

Blends of siloxane copolymers, notably siloxane polyimides, with polyaryl esters or polyaryl ester carbonates containing linkages derived from resorcinol, show improved flame resistance, as measured by two minute and peak heat release, compared to conventional polycarbonates. In some instances transparent flame retardant blends can also be prepared. The compositions show good melt processability, high impact strength and high elongation, and can be used to make various flame retardant articles including sheets and films.

21 Claims, No Drawings

OTHER PUBLICATIONS

ASTM D1003-00 "Standard Test Method for Haze and Luminous Transmittance of Transparent Plastics", 6 pgs.
ASTM D638-03 "Standard Test Method for Tensile Properties of Plastics", 15 pgs.
ASTM D256-05a "Standard Test Methods for Determining the Izod Pendulum Impact Resistance of Plastics", 20 pgs.
ASTM D1238-04C "Standard Test for Melt Flow Rates of Thermoplastics by Extrusion Plastomer", 14 pgs.
U.S. Appl. No. 10/878,954, filed Jun. 28, 2004, "Miscible Polyimide Blends".
U.S. Appl. No. 11/228,728, filed Sep. 16, 2005, "Flame Retardant Polymer Blends".
U.S. Appl. No. 11/228,729, filed Sep. 16, 2005, "Flame Retardant Polysulfone Blends".

* cited by examiner

FLAME RESISTANT POLYMER BLENDS

FIELD OF THE INVENTION

This invention relates to blends of resorcinol-based polyesters, or resorcinol-based polyester carbonate polymers, and siloxane copolymers having improved flame resistance. In some instances the flame retardant blends are transparent showing a high percent transmission with low haze.

BACKGROUND OF THE INVENTION

There has long been interest in developing thermoplastic resins that can resist burning. A specific area of concern is in developing plastics for transportation applications, such as rail cars and airplanes. Various evaluation techniques have been developed to test the effectiveness of such thermoplastic materials, for instance Federal Aviation Regulation (FAR) 25.853. In this test, sometimes referred to as the Ohio State University (OSU) rating, the amount of energy released after 2 minutes and the peak heat release energy are measured. Lower heat release values are desirable. Polymer blends that have been used in these applications are described, for example, in U.S. Pat. No. 5,051,483. These compositions combine polyetherimides (PEI) with a siloxane polyetherimide and a polycarbonate (PC). The existing PEI-PC blends are opaque and due to the high Tg of the PEI more difficult to mold, shape and form into articles than the lower Tg resorcinol-based polyarylate and polyester carbonate blends described herein. Most other lower Tg polyester or polycarbonate blends, while having better processability than the higher heat PEI blends, do not have the flame resistance necessary to meet the FAR requirements. In addition the development of transparent flame resistant compositions would further expand the utility of these types of materials. Therefore, despite the effectiveness of existing FAR compliant flame retardant compositions, there still exists a need for even better performance in this area.

BRIEF DESCRIPTION OF THE INVENTION

It has been found that blends of siloxane copolymers with resorcinol-based aryl polyester resins (including aryl polyester carbonate resins) have a surprising improvement in the flame retardant (FR) performance, and FAR 25.853 rating, when compared to otherwise similar blends of siloxane copolymers with polycarbonates. The presence of resorcinol moiety ester linkages in the aryl polyester resins gives a notable improvement in heat release, even in blends wherein the aryl polyester only has resorcinol moiety present as a minor component. The blends may also exhibit high tensile elongation at break, good notched Izod impact and facile melt processability. In some instances blends additionally having a high percent transmission (% T) and a low percent haze (% H) can be formed.

In one aspect, there is provided a composition comprising a resorcinol-based aryl polyester resin and a siloxane copolymer, wherein the composition has a peak heat release, as measured by FAR 25.853, of less than 65 kW/m².

In another aspect, there is provided a composition comprising a resorcinol-based aryl polyester resin and a siloxane copolymer, wherein the composition has a peak heat release, as measured by FAR 25.853, of less than 80 kW/m², and wherein the composition has a percent transmittance at 3.1 mm, as measured by ASTM D1003, of greater than or equal to 50 percent.

In yet another aspect, there is provided a composition comprising at least one resorcinol-based aryl polyester resin and at least one siloxane copolymer, wherein the composition has a peak heat release, as measured by FAR 25.853, of less than 80 kW/m² and wherein the siloxane copolymer is selected from the group consisting of polyimide siloxanes, polyetherimide siloxanes, polyetherimide sulfone siloxanes, polysulfone siloxanes, polyether sulfone siloxanes, polyphenylene ether sulfone siloxanes, and polyphenylene ether siloxanes, and wherein the composition does not comprise a polycarbonate siloxane.

In yet a further aspect, there is provided a composition comprising at least one resorcinol-based aryl polyester resin and at least one siloxane copolymer, wherein the composition has a peak heat release, as measured by FAR 25.853, of less than 80 kW/m² and wherein the siloxane copolymer is selected from the group consisting of polyimide siloxanes, polyetherimide siloxanes, polyetherimide sulfone siloxanes, polysulfone siloxanes, polyether sulfone siloxanes, polyphenylene ether sulfone siloxanes, and polyphenylene ether siloxanes, and wherein the composition does not comprise a polycarbonate siloxane.

In another aspect, there is provided a composition consisting essentially of at least one resorcinol-based aryl polyester resin and at least one siloxane copolymer, wherein the composition has a peak heat release, as measured by FAR 25.853, of less than 80 kW/m² and wherein the siloxane copolymer is selected from the group consisting of polyimide siloxanes, polyetherimide siloxanes, polyetherimide sulfone siloxanes, polysulfone siloxanes, polyether sulfone siloxanes, polyphenylene ether sulfone siloxanes, and polyphenylene ether siloxanes.

In another aspect there is provided composition comprising at least one resorcinol-based aryl polyester resin and from 0.1 to 5.0 wt % based on the total weight of the composition of at least one siloxane copolymer, wherein the composition has a peak heat release, as measured by FAR 25.853, of less than 65 kW/m², and wherein the composition has a percent transmittance at 3.1 mm, as measured by ASTM D1003, of greater than or equal to 50 percent, and wherein the resorcinol-based aryl polyester resin has a hydrogen atom to carbon atom ratio of less than or equal to 0.75:1.

In yet other aspect there are provided transportation devices comprising parts including the compositions described above and articles made from the compositions described above.

DETAILED DESCRIPTION OF THE INVENTION

For purposes of this specification the words "moiety" or "residue" will be used to refer to structures in a polymer derived from particular monomers used to make the polymer. The words "chain member" or "block" will be used to refer to segments of certain residues in a polymer wherein the polymer may also have different segments comprising different residues. For example, if a group of monomer compounds is reacted to form a first pre-polymer containing certain moieties, and then another different group of compounds is reacted to form a second pre-polymer containing other moieties, and these two pre-polymers are then reacted together to form a block copolymer, then each pre-polymer shall be referred to as a "chain member" or "block."

For purposes of this specification the terms "resorcinol-based aryl polyesters" and "resorcinol-based polyaryl esters" and "resorcinol-based polyarylate" shall all mean a copolymer comprising resorcinol moieties and resorcinol-based ester linkages and possibly other linkages also such as resorcinol-based polycarbonate linkages. These terms are meant to include both polyesters only containing ester bonds and polyester carbonates in instances where resorcinol-based polycarbonate linkages are present.

In the context of this invention the term "polymer linkage" or "a polymer linkage" is defined as the type of chemical bond present in a polymer between two moieties. For example, a resorcinol-based polyaryl ester may comprise both carbonate linkages (e.g., between a resorcinol moiety and a bisphenol A moiety) and ester linkages (e.g., between a resorcinol moiety and a isophthalic acid moiety).

Blends of siloxane copolymers, for instance siloxane polyimides or siloxane polycarbonates, with resorcinol derived polyaryl esters have surprisingly low heat release values. The siloxane copolymers can be very effective in improving flame retardant (FR) performance even when included in such a blend at a very low concentration. This behavior is also observed when the resorcinol-based aryl polyester is a copolymer containing non-resorcinol-based moieties, for instance a resorcinol—bisphenol-A copolyester carbonate. For best effect, resorcinol moiety content (RMC) should be greater than about 40 mole % of the total monomer-derived moieties present in the resorcinol-based aryl polyester. In some instances RMC of greater than 50 mole %, or even as high as 80 or 100 mole % resorcinol moieties may be desired In some instances the resorcinol-based polyarylate resin may contain at least about 40 mole % of moieties derived from resorcinol. The resorcinol moieties are typically introduced as the reaction product of resorcinol, or functionalized resorcinol, with an aryl dicarboxylic acid or aryl dicarboxylic acid derivatives suitable for the formation of aryl ester linkages with the resorcinol. Suitable dicarboxylic acid derivatives include, for example, carboxylic acid halides, carboxylic acid esters and carboxylic acid salts.

The resorcinol-based polyarylate may further contain carbonate linkages derived from reaction of a bisphenol and a carbonate forming species, such as phosgene, making the resorcinol-based polyarylate a polyester carbonate copolymer. In another embodiment of the invention, resorcinol polyarylate carbonate copolymers will comprise the reaction products of iso and terephthalic acid, resorcinol and optionally, bisphenol A and phosgene. In one aspect, the resorcinol polyester carbonate copolymer will be made in such a way that the number of bisphenol dicarboxylic ester linkages is minimized, for example by pre-reacting the resorcinol with the dicarboxylic acid to form an aryl polyester block and then reacting the aryl polyester block with the bisphenol and carbonate moiety to form the polycarbonate portion of the copolymer. Examples of resorcinol ester containing polymers can be found in U.S. Pat. Nos. 6,861,482, 6,559,270, 6,265, 522, 6,294,647, 6,291,589 and 5,916,997.

In another aspect, the present invention comprises polymers containing arylate polyester chain sections. The arylate polyester chain sections comprise at least one diphenol residue in combination with at least one aromatic dicarboxylic acid residue. In one embodiment the diphenol residue is derived from 1,3-dihydroxybenzene, which is commonly referred to as resorcinol. When resorcinol is reacted into a polymer, it forms the structure shown in Formula I below, which is referred to herein as a resorcinol moiety.

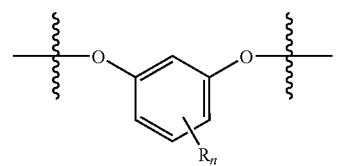

Formula I

In Formula I, each R is independently at least one of $C_{1-2}$ alkyl, $C_6$-$C_{24}$ aryl, alkyl aryl, alkoxy or halogen, and n is and integer from 0 to 4. "Resorcinol moiety" as used herein should be understood to include moieties derived from either unsubstituted 1,3-dihydroxybenzene or substituted 1,3-dihydroxybenzenes unless explicitly stated otherwise.

Examples of dicarboxylic acids suitable for making the resorcinol-based polyarylate include, but are not limited to, aromatic dicarboxylic acids derived from aromatic monocyclic compounds. In various embodiments, suitable dicarboxylic acids include isophthalic acid, terephthalic acid, or mixtures of isophthalic and terephthalic acids. Suitable dicarboxylic acids also include those derived from aromatic polycyclic compounds, illustrative examples of which include diphenyl dicarboxylic acid, diphenylether dicarboxylic acid, and naphthalenedicarboxylic acids, such as naphthalene-2,6-dicarboxylic acid. Alternatively, dicarboxylic acid derivatives, such as diesters of dicarboxylic acids or acid halides of dicarboxylic acids (e.g., diacid chlorides), may be used to prepare the resorcinol containing polyaryl esters. Formula II below encompasses the dicarboxylic acid residues present in the resorcinol-based polyarylates made from reacting a diol with an isophthalic and/or terephthalic acid and/or suitable derivatives of the acids such as the acid halides, carboxylic acid esters and carboxylic acid salts of isophthalic and/or terephthalic acid.

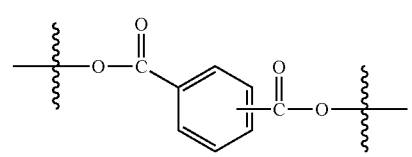

Formula II

In one embodiment, the present invention provides thermally stable polymers comprising resorcinol arylate polyester chain members joined by ester linkages as typically illustrated in Formula III wherein R and n are as previously defined:

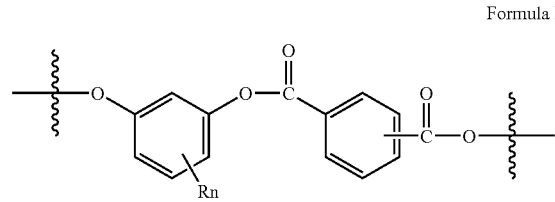

Formula III

In another aspect, the present invention provides a composition comprising a resin produced using an interfacial polymerization method of preparing polymers comprising resorcinol arylate polyester chain members substantially free of anhydride linkages. This method comprises a first step of combining at least one resorcinol moiety, an aromatic dicarboxylic acid chloride and at least one catalyst in a mixture of water and at least one organic solvent substantially immiscible with water. Suitable resorcinol moieties comprise units of Formula IV:

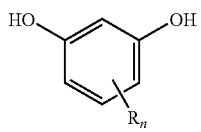

Formula IV wherein each R is independently at least one of $C_{1-2}$ alkyl, $C_6$-$C_{24}$ aryl, alkyl aryl, alkoxy or halogen, and n is an integer from 0 to 4. Suitable $C_{1-12}$ alkyl groups include, but are not limited to, methyl, ethyl, n-propyl, isopropyl, butyl, iso-butyl, t-butyl, hexyl, cyclohexyl, nonyl, decyl, and aryl-substituted alkyl, including benzyl. In a particular embodiment an alkyl group is methyl. Suitable halogen groups are bromo, chloro, and fluoro. The value for n in various embodiments may be 0 to 3, in some embodiments 0 to 2, and in still other embodiments 0 to 1. In one embodiment a resorcinol moiety is 2-methylresorcinol. In another embodiment the resorcinol moiety is an unsubstituted resorcinol moiety in which n is zero. The catalyst is typically present at a total level of 0.01 to 10 mole %, and in some embodiments at a total level of 0.2 to 6 mole % based on total molar amount of acid chloride groups. Examples of suitable catalysts are tertiary amines, quaternary ammonium salts, quaternary phosphonium salts, hexaalkylguanidinium salts, and mixtures thereof.

Examples of suitable aryl dicarboxylic acid derivatives include aryl dicarboxylic acid dihalides. Suitable aryl dicarboxylic acid dihalides may comprise aromatic dicarboxylic acid dichlorides derived from monocyclic moieties, illustrative examples of which include isophthaloyl dichloride, terephthaloyl dichloride, or mixtures of isophthaloyl and terephthaloyl dichlorides. Suitable aryl dicarboxylic acid dihalides may also comprise aromatic dicarboxylic acid dichlorides derived from polycyclic moieties, illustrative examples of which include diphenyl dicarboxylic acid dichloride, diphenylether dicarboxylic acid dichloride, and naphthalenedicarboxylic acid dichloride, such as naphthalene-2,6-dicarboxylic acid dichloride; or from mixtures of monocyclic and polycyclic aromatic dicarboxylic acid dichlorides. In one embodiment, the aryl dicarboxylic acid dichloride comprises mixtures of isophthaloyl and/or terephthaloyl dichlorides as typically illustrated in Formula V.

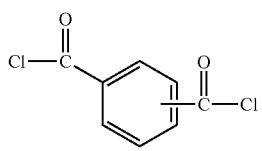

Formula V

Either or both of isophthaloyl and terephthaloyl dichlorides may be present. In some embodiments the dicarboxylic acid dichlorides comprise mixtures of isophthaloyl and terephthaloyl dichloride in a molar ratio of isophthaloyl to terephthaloyl of about 0.25:1 to about 4.0:1; in other embodiments the molar ratio is about 0.4:1 to about 2.5:1; and in still other embodiments the molar ratio is about 0.67:1 to about 1.5:1.

Dicarboxylic acid halides provide only one method of preparing the polymers mentioned herein. Other methods for making the resorcinol arylate linkages are also contemplated using, for example, the dicarboxylic acids, a dicarboxylic acid esters, such as an activated ester, or dicarboxylate salts or partial salts.

At least one chain-stopper (also referred to sometimes hereinafter as capping agent) may also be present in the method and compositions of the invention. A purpose of adding at least one chain-stopper is to limit the molecular weight of the polymer comprising resorcinol arylate polyester moieties, thus providing the polymer with controlled molecular weight and favorable processability. Typically, at least one chain-stopper is added when the resorcinol arylate-containing polymer is not required to have reactive end-groups for further reaction. In the absence of chain-stopper, resorcinol arylate-containing polymers may be either used in solution or recovered from solution for subsequent use such as in preparing copolymer formations that may require the presence of reactive end-groups, typically hydroxy, on the resorcinol-arylate polyester segments. A chain-stopper may be at least one of: mono-phenolic compounds, mono-carboxylic acids, mono-carboxylic acid chlorides, and/or mono-chloroformates. Typically, the at least one chain-stopper is added to the reaction mixture in an amount of 0.05 to 10 mole % based on the amount of resorcinol and resorcinol derivative added in the reaction mixture in the case of mono-phenolic compounds, and based on the amount of acid dichloride added to the reaction mixture in the case of mono-carboxylic acid chlorides and/or mono-chloroformates.

Suitable mono-phenolic compounds include, but are not limited to, monocyclic phenols, such as phenol, $C_1$-$C_{22}$ alkyl-substituted phenols, p-cumyl-phenol, p-tertiary-butyl phenol, hydroxy diphenyl; monoethers of diphenols, such as p-methoxyphenol or chroman and alkyl-substituted phenols such as those with branched chain alkyl substituents having 8 to 9 carbon atoms as described, for example, in U.S. Pat. No. 4,334,053. In some embodiments mono-phenolic chain-stoppers are phenol, p-cumylphenol, and resorcinol monobenzoate.

Suitable mono-carboxylic acid chlorides include monocyclic, mono-carboxylic acid chlorides, such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides, such as trimellitic anhydride chloride, and naphthoyl chloride; and mixtures of monocyclic and polycyclic mono-carboxylic acid chlorides. The chlorides of aliphatic mono-carboxylic acids with up to 22 carbon atoms and functionalized chlorides of aliphatic monocarboxylic acids, such as acryloyl chloride and methacryoyl chloride, are also suitable. Examples of mono-chloroformates include monocyclic, mono-chloroformates, such as phenyl chloroformate, alkyl-substituted phenyl chloroformate, p-cumyl phenyl chloroformate, toluene chloroformate, and mixtures thereof.

A chain-stopper can be combined together with the resorcinol moieties, can be contained in the solution of dicarboxylic acid dichlorides, or can be added to the reaction mixture after production of a pre-polymer, where at least a portion of the reactants have been polymerized. If mono-carboxylic acid chlorides and/or mono-chloroformates are used as chain-stoppers, they are often introduced together with any dicarboxylic acid dichlorides. These chain-stoppers can also be added to the reaction mixture at a moment when the chlorides of dicarboxylic acid have already reacted substantially or to completion. If phenolic compounds are used as chain-stoppers, they can be added in one embodiment to the reaction mixture during the reaction, or, in another embodiment, before the beginning of the reaction between the resorcinol moiety and the acid chloride moiety. When hydroxy-terminated resorcinol arylate-containing precondensate or oligomers are prepared, then chain-stopper may be absent or only present in small amounts to aid control of oligomer molecular weight.

In another embodiment the invention may encompass the inclusion of at least one branching agent such as a trifunctional or higher functional carboxylic acid chloride and/or trifunctional or higher functional phenol. A branching agent is a compound that causes polymer chains to contain links between them rather than just grow as a group of independent linear strands. Typical branching agents have three or more reactive groups rather than the two groups that exist with typical monomers, and the one reactive group that exists for the chain-stoppers described above. Such branching agents, if included, can typically be used in quantities of 0.005 to 1 mole %, based on dicarboxylic acid dichlorides or resorcinol moieties used. Suitable branching agents include, for example, trifunctional or higher carboxylic acid chlorides, such as trimesic acid tri acid chloride, 3,3',4,4'-benzophenone tetracarboxylic acid tetrachloride, 1,4,5,8-naphthalene tetracarboxylic acid tetrachloride or pyromellitic acid tetrachloride, and trifunctional or higher phenols, such as 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methyl phenol, 2-(4-hydroxyphenyl)-2-(2,4-dihydroxyphenyl)-propane, tetra-(4-[4-hydroxyphenylisopropyl]-phenoxy)-methane, 1,4-bis-[(4,4-dihydroxytriphenyl)methyl]-benzene. Phenolic branching agents may be introduced first with the resorcinol moieties while acid chloride branching agents may be introduced together with acid dichlorides.

In one of its embodiments the invention comprises thermally stable resorcinol arylate polyesters made by the present method and substantially free of anhydride linkages linking at least two units of the polyester chain. In a particular embodiment the aryl polyesters comprise dicarboxylic acid residues derived from a mixture of iso- and terephthalic acids as illustrated in Formula VI:

Formula VI

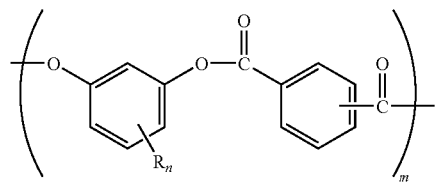

wherein R is at least one of $C_{1-12}$ alkyl, $C_6$-$C_{24}$ aryl, alkyl aryl, alkoxy or halogen, n is 0-4, and m is at least about 5 to about 10,000. In various embodiments n is zero and m is between about 10 and about 300. The molar ratio of isophthalate to terephthalate is in one embodiment about 0.25:1 to about 4.0:1, in another embodiment about 0.4:1 to about 2.5:1, and in still another embodiment about 0.67:1 to about 1.5:1. As used herein, "substantially free of anhydride linkages" means that the polyesters exhibit a decrease in weight average molecular weight (Mw) in one embodiment of less than 30% upon heating the polymer at a temperature of about 280-290° C. for five minutes. In another instance polyesters will have even better thermal stability, showing less than 10% loss of weight average molecular weight (Mw) after five minutes at about 280-290° C. Molecular weight can be determined by standard methods known in the art, for example gel permeation chromatography.

Resorcinol arylate copolyesters containing soft-block segments as disclosed in U.S. Pat. No. 5,916,997 are another example of resorcinol-based polyarylates. The term "soft-block," as used herein, indicates that some segments of the polymers are made from non-aromatic monomer units. Such non-aromatic monomer units are generally aliphatic and are known to impart flexibility at a molecular level (hence the term "soft") to the soft-block-containing polymers. The copolyesters include those comprising structural units of Formulas I, VII, and VIII:

Formula I

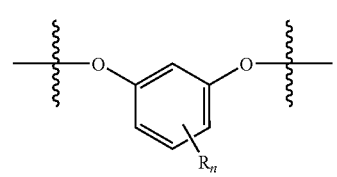

Formula VII

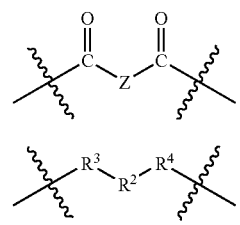

Formula VIII

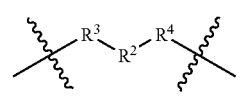

wherein R and n are as previously defined, Z is a divalent aromatic radical, $R^2$ is a $C_{3-20}$ straight chain alkylene, $C_{3-10}$ branched alkylene, or $C_{4-10}$ cyclo- or bicycloalkylene group, and $R^3$ and $R^4$ each independently represent

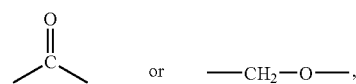

and wherein Formula VIII contributes from about 1 to about 45 mole percent to the ester linkages of the polyester, optionally from about 5 to about 40 mole percent to the ester linkages of the polyester, and further optionally from about 5 to about 20 mole percent to the ester linkages of the polyester. In one embodiment, $R^2$ is a $C_{3-14}$ straight chain alkylene, or $C_{5-6}$ cycloalkylene, and in another embodiment $R^2$ is a $C_{3-10}$ straight-chain alkylene or $C_6$-cycloalkylene. Formula VII can represent an aromatic dicarboxylic acid residue. The divalent aromatic radical Z in Formula VII may be derived in various embodiments from at least one of the suitable dicarboxylic acid residues as defined hereinabove, and in some embodiments at least one of 1,3-phenylene, 1,4-phenylene, or 2,6-naphthylene. In various embodiments Z comprises at least about 40 mole % 1,3-phenylene. In various embodiments of copolyesters containing soft-block chain members n in Formula I is zero.

In another embodiment the present invention comprises block copolyestercarbonates comprising resorcinol arylate-containing blocks in combination with organic carbonate blocks. The blocks comprising resorcinol moieties are substantially free of anhydride linkages. The block copolyestercarbonates include those comprising alternating arylate and organic carbonate blocks, typically as illustrated in Formula IX,

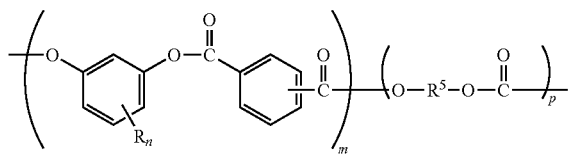

Formula IX wherein R and n are as previously defined, and $R^5$ is at least one divalent organic radical. The arylate blocks have a degree of polymerization (DP), represented by m, in one embodiment of at least about 4, in another embodiment of at least about 10, in another embodiment of at least about 20 and in still another embodiment of about 30 to about 150. The DP of the organic carbonate blocks, represented by p, is in one embodiment generally at least about 2, in another embodiment at least about 2 to about 200 and in another embodiment about 10 to about 20. The distribution of the blocks may be such as to provide a copolymer having any desired weight proportion of arylate blocks in relation to carbonate blocks. In general, the content of arylate blocks is in one embodiment about 10 to about 95% by weight and in another embodiment about 40 to about 95% by weight.

Although a mixture of iso- and terephthalate is illustrated in Formula IX, the dicarboxylic acid residues in the arylate blocks may be derived from any suitable dicarboxylic acid compound, as defined hereinabove, or mixture of suitable dicarboxylic acid compounds, including those derived from aliphatic diacid dichlorides. In various embodiments n is zero and the arylate blocks comprise dicarboxylic acid residues derived from a mixture of iso- and terephthalic acid residues, wherein the molar ratio of isophthalate to terephthalate is in one embodiment about 0.25:1 to about 4.0:1, in another embodiment about 0.4:1 to about 2.5:1, and in still another embodiment about 0.67:1 to about 1.5:1. In the organic carbonate blocks, each $R^5$ is independently a divalent organic radical. In various embodiments the radical comprises at least one dihydroxy-substituted aromatic hydrocarbon, and at least about 60 mole % of the total number of $R^5$ groups in the polymer are aromatic organic radicals and the balance thereof are aliphatic, alicyclic, or aromatic radicals. Suitable $R^5$ radicals include m-phenylene, p-phenylene, 4,4'-biphenylene, 4,4'-bi(3,5-dimethyl)-phenylene, 2,2-bis(4-phenylene)propane, 6,6'-(3,3,3',3'-tetramethyl- 1,1'-spirobi[1H-indan]) and similar radicals such as those which correspond to the dihydroxy-substituted aromatic hydrocarbons disclosed in U.S. Pat. No. 4,217,438. The radical $R^5$ can often be the reaction residue of bisphenols. The term "bisphenol" and "bisphenols" is used herein to designate dihydroxy-substituted aromatic hydrocarbons. It should be understood, however, that non-bisphenol compounds of this type can also be employed as appropriate.

In some embodiments each $R^5$ is an aromatic organic radical and in other embodiments a radical of Formula X:

-$A^1$-Y-$A^2$-  Formula X wherein each $A^1$ and $A^2$ is a monocyclic divalent aryl radical and Y is a bridging radical in which at least one or two carbon atoms separate $A^1$ and $A^2$. The bonds in Formula X are usually in the meta or para positions of $A^1$ and $A^2$ in relation to Y. In Formula X, $A^1$ and $A^2$ typically represent unsubstituted phenylene or substituted derivatives thereof, illustrative substituents (one or more) being alkyl, alkenyl, and halogen (particularly bromine). In one embodiment $A^1$ and $A^2$ are unsubstituted phenylene radicals. Both $A^1$ and $A^2$ are often p-phenylene, although both may be o- or m-phenylene or one o- or m-phenylene and the other p-phenylene. Mixtures of these isomers may also be employed. The bridging radical, Y, is one in which at least one or two atoms separate $A^1$ from $A^2$. In a particular embodiment one atom separates $A^1$ from $A^2$. Illustrative radicals of this type are —O—, —S—, —SO— or —$SO_2$—, methylene, cyclohexyl methylene, 2-[2.2.1]-bicycloheptyl methylene, ethylene, isopropylidene, neopentylidene, cyclohexylidene, cyclopentadecylidene, cyclododecylidene, adamantylidene, and like radicals. In some instances gem-alkylene (commonly known as "alkylidene") radicals are desired. Also included, however, are unsaturated radicals. In some embodiments the bisphenol is 2,2-bis(4-hydroxyphenyl)propane (bisphenol-A or BPA), in which Y is isopropylidene and $A^1$ and $A^2$ are each p-phenylene. Depending upon the molar excess of resorcinol moiety present in the reaction mixture, $R^5$ in the carbonate blocks may at least partially comprise resorcinol moiety. In other words, in some embodiments carbonate blocks of Formula X may comprise a resorcinol moiety in combination with at least one other dihydroxy-substituted aromatic hydrocarbon.

Diblock, triblock, and multiblock copolyestercarbonates are encompassed in the present invention. The chemical linkages between blocks comprising resorcinol arylate chain members and blocks comprising organic carbonate chain members may comprise at least one of (a) an ester linkage between a suitable dicarboxylic acid residue of an arylate moiety and an —O—$R^5$—O—moiety of an organic carbonate moiety, for example as typically illustrated in Formula XI, wherein $R^5$ is as previously defined:

Formula XI

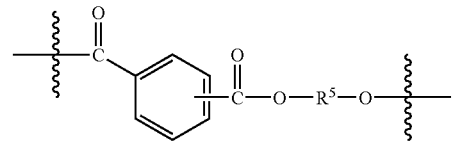

and (b) a carbonate linkage between a diphenol residue of a resorcinol arylate moiety and a —(C=O)—O—moiety of an organic carbonate moiety as shown in Formula XII, wherein R and n are as previously defined:

Formula XII

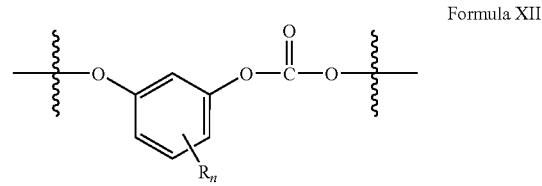

The presence of a significant proportion of ester linkages of the type (a) may result in undesirable color formation in the copolyestercarbonates. Although the invention is not limited by theory, it is believed that color may arise, for example, when $R^5$ in Formula XI is bisphenol A and the moiety of Formula XI undergoes Fries rearrangement during subsequent processing and/or light-exposure. In one embodiment the copolyestercarbonate substantially comprises a diblock copolymer with a carbonate linkage between the resorcinol arylate block and an organic carbonate block wherein linkages of type (a) are minimized.

Copolyestercarbonates with at least one carbonate linkage between a thermally stable resorcinol arylate block and an organic carbonate block are typically prepared from resorcinol arylate-containing pre-polymer oligomers prepared by various embodiments of the invention and containing in one embodiment at least one and in another embodiment at least two hydroxy-terminal sites. The oligomers typically have weight average molecular weight in one embodiment of about 10,000 to about 60,000, and in another embodiment of about 15,000 to about 30,000. Thermally stable copolyestercarbonates may be prepared by reacting the resorcinol arylate-containing oligomers with phosgene, at least one chain-stopper, and at least one dihydroxy-substituted aromatic hydrocarbon in the presence of a catalyst such as a tertiary amine.

In some instances resorcinol-based aryl polyester resin will have a hydrogen atom to carbon atom ratio (H:C) of less than or equal to about 0.75:1. Polymers with higher carbon content relative to hydrogen content, that is a low ratio of hydrogen to carbon atoms, often show improved FR performance. These polymers have lower fuel value and may give off less energy when burned. It is also thought that they can resist burning through a tendency to form an insulating char layer between the polymeric fuel and the source of ignition. Independent of any specific mechanism or mode of action, it has been observed that such polymers, with a low H:C ratio, have superior flame test performance. In some instances the H:C ratio can be less than 0.75:1. In other instances a H:C ratio of greater than about 0.4:1 is desired in order to give polymeric structures with sufficient flexible linkages to achieve melt processability. In still other embodiments the resorcinol base polymer will have a H:C ratio of from about 0.4:1 to about 0.75:1. The H:C ratio of a given polymer or copolymer can be determined from its chemical structure by a count of carbon and hydrogen atoms independent of any other atoms present in the chemical repeat unit.

In one embodiment the flame retardant polymer blends, and articles made from them, will have two minute heat release of less than about 80 kW-min/m$^2$. In other instances the peak heat release will be less than about 80 kW/m$^2$. In another instance both the two minute heat release and peak heat release will be below about 65 kW-min/m$^2$ and 65kW/m$^2$ respectively, optionally below about 50 kW-min/m$^2$ and 50 kW/m$^2$ respectively. It is generally desirable for the two minute heat release to be as low as possible.

In some embodiments the blend of siloxane copolymers and aryl polyester resin containing resorcinol derived linkages will be transparent. "Transparent," as used herein, means having a percent transmittance of greater than about 50%, as measured by ASTM method D1003, on a 3.1 mm molded sample. In other instances the percent haze of these transparent compositions, as measured by ASTM method D1003, will be less than about 25%. In other embodiments the percent transmittance (% T) will be greater than about 60% and the percent haze less than about 20%. In still other instances the compositions, and articles made from it, will have a transmittance of greater than about 50% and a haze value (% H) below about 25% with a peak heat release of less than or equal to 80 kW/m$^2$.

In the flame retardant blends presented herein the resorcinol-based aryl polyester resins, and mixtures thereof, can be present in amounts of about 80 to about 99.9 weight percent, based on the total weight of the composition. Within this range, the amount of resorcinol-based aryl polyester resins and mixtures thereof can be greater than or equal to about 90, more specifically greater than or equal to about 95, and even more specifically greater than or equal to about 97 weight percent of the total composition.

In one embodiment the flame retardant polymer blend comprises:
a) 80.0 to 99.9% by weight of an aryl polyester resin containing resorcinol derived linkages,
c) 0.1 to 20.0% by weight of siloxane copolymer
d) 0 to 2% by weight of one or more phosphorus containing stabilizers, and
e) 0 to 20% by weight of one or more metal oxides.

In another embodiment the flame retardant polymer blend comprises:
a) 90.0 to 99.9% by weight of an aryl polyester resin containing at least 40 mole % resorcinol derived linkages,
b) 0.1 to 10.0% by weight of siloxane polyetherimide copolymer
c) 0 to 2% by weight of one or more phosphorus containing stabilizers, and
d) 0 to 20% by weight of one or more metal oxides.

Any siloxane copolymer can be used in any effective amounts to improve the heat release performance of the composition. In some instances, siloxane copolymers of polyetherimides, polyetherimide sulfones, polysulfones, polyphenylene ether sulfones, polyether sulfones or polyphenylene ethers maybe used. In other instances, polyarylate, polyester carbonate or polycarbonate siloxane containing copolymers can be effective in reducing heat release and improving FR performance. Mixtures of different types of siloxane copolymers are also contemplated. In some embodiments the siloxane copolymer can be present in the mixture from 0.1 to about 9.0%, or from 0.1 to 7.0%, or from 0.1 to 5.0% by weight of the total weight of the polymer blend. In such instances, the siloxane copolymer may contain approximately 20 weight percent of siloxane block versus its total composition, so the total weight of the siloxane block in the composition may be from 0.02 to 1.8 weight percent, or from 0.02 to 1.4 weight percent, or from 0.02 to 1.0 weight percent respectively. As used herein, the term "siloxane" refers to polymers having at least one linkage wherein a silicon atom is directly bonded to at least one oxygen atom.

The block length of the siloxane segment of the copolymer may be of any effective length. In some examples, the block length z can be of 2 to about 100 siloxane repeating units, wherein a siloxane unit is $(-A_2Si-O-)_z$, and wherein A is an alkyl group. In other instances the siloxane block length it can be from 5 to about 50 repeat units. Siloxane copolymers with from 5 to about 70 wt % siloxane content are desirable in some instances. In other embodiments siloxane copolymers with predominantly dimethyl siloxane repeating units are preferred (e.g., polydimethylsiloxane).

Siloxane polyimide copolymers are a specific embodiment of the siloxane copolymers that may be used in the blends of this invention. Examples of such siloxane polyimides are described in U.S. Pat. Nos. 5,028,681, 4,808,686, 4,690,997, 4,404,350, 4,051,163, 4,011,279, 3,847,867, 3,833,546 and 3,325,450. Siloxane polyimides can be prepared by standard methods to make polyimides wherein at least a portion, generally from 5 to 70 wt. %, and optionally from 10 to 50 wt. %, of the imide is derived from siloxane containing diamines, siloxane containing dianhydrides or chemical equivalents thereof.

The siloxane polyimide can be prepared by any of the methods known to those skilled in the art, including the reaction of an aromatic bis(ether anhydride) of the Formula XIII,

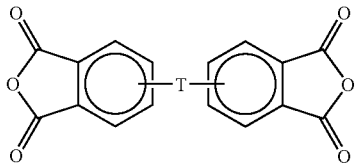

Formula XIII with an organic diamine of the Formula XIV,

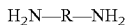

Formula XIV wherein T is a divalent moiety selected from the group consisting of —O—, —S—, —C(O)—, SO$_2$—, —SO—, a direct linkage, a fused ring linkage, or a group of the formula —O-Z-O— wherein the divalent bonds of the -T- or the —O-Z-O— group are in the 3,3', 3,4', 4,3', or the 4,4' positions, and wherein Z includes, but is not limited, (a) aromatic hydrocarbon radicals having about 6 to about 36 carbon atoms and halogenated derivatives thereof including perfluoroalkylene groups; (b) straight or branched chain alkylene radicals having about 2 to about 24 carbon atoms (c) cycloalkylene radicals having about 3 to about 20 carbon atoms, or (d) divalent radicals of the general Formula XV:

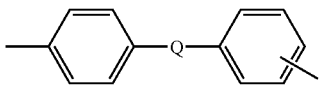

Formula XV wherein Q includes but is not limited to a divalent moiety selected from the group consisting of —O—, —S—, —C(O)—, —SO$_2$—, —SO—, —C$_y$H$_{2y}$— (y being an integer from 1 to 8), and fluorinated derivatives thereof, including perfluoroalkylene groups, and wherein at least a portion of the reactants, either dianhydride, diamine, or mixtures thereof, contain a siloxane functionality. The moiety R in Formula XIV includes but is not limited to substituted or unsubstituted divalent organic radicals such as: (a) aromatic hydrocarbon radicals having about 6 to about 36 carbon atoms and halogenated derivatives thereof; (b) straight or branched chain alkylene radicals having about 2 to about 20 carbon atoms (c) cycloalkylene radicals having about 3 to about 24 carbon atoms, or (d) divalent radicals of the general Formula XV.

Examples of suitable diamine compounds are ethylenediamine, propylenediamine, trimethylenediamine, decamethylenediamine, 1,12-dodecanediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl- 1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis (2-chloro-4-amino-3,5-diethylphenyl) methane, bis(4-aminophenyl) propane, 2,4-bis(p-armino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis (4-aminophenyl) sulfone, bis(4-aminophenyl) ether and 1,3-bis(3-aminopropyl) benzene. Mixtures comprising at least one of the foregoing compounds may also be used. In some embodiments, diamino compounds are aromatic diamines, especially m- and p-phenylenediamine, sulfonyl dianilines, bis aminophenoxy benzenes, bis amino phenoxy sulfones and mixtures comprising at least one of the foregoing diamines.

Examples of specific aromatic bis anhydrides and organic diamines are disclosed in U.S. Pat. Nos. 3,972,902 and 4,455, 410. Illustrative examples of aromatic bis anhydrides include: 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl] propane dianhydride; 4,4'-bis(2,3-dicarboxyphenoxy)diphenyl ether dianhydride; 4,4'-bis(2,3-dicarboxyphenoxy) diphenyl sulfide dianhydride; 4,4'bis(2,3-dicarboxyphenoxy) benzophenone dianhydride; 4,4'-bis(2,3-dicarboxyphenoxy) diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy) diphenyl ether dianhydride; 4-(2,3-dicarboxyphenoxy)-4'-(3, 4-dicarboxyphenoxy)diphenyl sulfide dianhydride; 4-(2,3-dicarboxyphenoxy)-4'-(3,4-dicarboxyphenoxy) benzophenone dianhydride and 4-(2,3-dicarboxyphenoxy)-4'-(3,4-dicarboxyphenoxy)diphenyl sulfone dianhydride, pyromellitic dianhydride, biphenyl dianhydride, oxy diphthalic anhydride, sulfone diphthalic anhydride, hydroquinone diphthalic anhydride, resorcinol diphthalic anhydride and mixtures comprising at least one of the foregoing compounds.

The polyimide siloxanes can also be prepared in a manner similar to that used for polyimides, except that a portion, or all, of the organic diamine reactant is replaced by an amine-terminated organo siloxane, for example of the Formula XVI wherein g is an integer from 1 to about 100, optionally from about 5 to about 50, and R' is an aryl, alkyl or aryl alky group of from 2 to 20 carbon atoms.

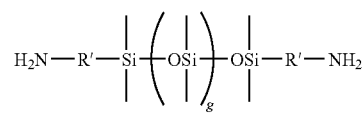

Formula XVI

Some polyimide siloxanes may be formed by reaction of an organic diamine, or mixture of diamines, and the amine-terminated organo siloxane of Formula XVI, and one or more dianhydrides. The diamino components may be physically mixed prior to reaction with the bis-anhydride(s), thus forming a substantially random copolymer. Alternatively block or alternating copolymers may be formed by selective reaction of XVI with dianhydrides to make polyimide blocks that are subsequently reacted together. In another instance the siloxane used to prepare the polyimide copolymer may have anhydride rather than amine functional end groups, for example as described in U.S. Pat. No. 4,404,350.

In another embodiment the siloxane polyimide copolymer can be of Formula XVII wherein T, R' and g are described as above, n is from 5 to about 100 and Ar is an aryl or alkyl aryl group of from 6 to 36 carbons.

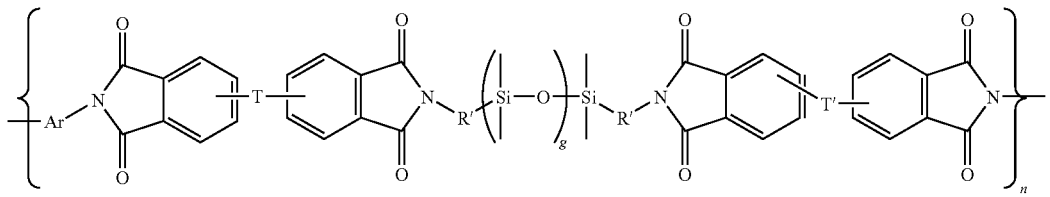

Formula XVII

In some siloxane polyetherimides the diamine component of the siloxane polyetherimide copolymers may contain from about 5 to 70 wt. % of the amine-terminated organo siloxane of Formula XVI and from about 30 to 95 wt. % of the organic diamine of Formula XIV. In some siloxane copolymers, the siloxane component contains from about 25 to about 40 wt. % of the amine or anhydride terminated organo siloxane.

In some embodiments the siloxane polyimides can be siloxane polyetherimides which contain aryl ether linkages that can be derived by polymerization of dianhydrides and/or diamines wherein at least a portion of the dianhydride or the diamine contains an aryl ether linkage. In some instances both the diamine and dianhydride will contain an aryl ether linkage and at least a portion of the diamine or dianhydride will contain siloxane functionality, for example as described above. In other embodiments the aryl ether linkage can de derived from dianhydrides such as bisphenol A diphthalic anhydride, biphenol diphthalic anhydride, oxy diphthalic anhydride or mixtures thereof. In still other siloxane polyetherimides the aryl ether linkages can be derived from at least one diamine containing an aryl ether linkages, for example, diamino diphenyl ethers, bis amino phenoxy benzenes, bis amino phenoxy phenyl sulfones or mixtures thereof. Either the diamine or dianhydride may have aryl ether linkages or in some instances both monomers may contain aryl ether linkages.

In some other embodiments the siloxane polyimide will be a siloxane polyetherimide sulfone and can contain aryl sulfone linkages and aryl ether linkages. Sulfone linkages may be introduced into the polymer by polymerization of dianhydrides and/or diamines wherein at least a portion of the dianhydride or the diamine contains an aryl sulfone linkage. In some instances both the diamine and dianhydride will contain an aryl ether linkage or an aryl sulfone linkage and at least a portion of the diamine or dianhydride will contain siloxane functionality, for example as described above. In other embodiments the aryl ether linkage can de derived from dianhydrides such as sulfone diphthalic anhydride, diphenyl sulfone diphthalic anhydride or mixtures thereof. In still other siloxane polyetherimide sulfones the aryl ether linkages can be derived from at least one diamine containing a aryl sulfone linkages, for example, diamino diphenyl sulfones (DDS), bis amino phenoxy phenyl sulfones (BAPS) or mixtures thereof. Either the diamine or dianhydride may have an aryl sulfone linkage or in some instances both monomers may also contain aryl sulfone linkages.

In another instance the siloxane copolymer can be a siloxane polycarbonate, a siloxane polyarylate or a siloxane polyester carbonate copolymer. Examples of polycarbonate siloxane copolymers are described in U.S. Pat. Nos. 6,833,422, 6,657,018, 6,072,011, 3,419,635 and 3,189,662.

Siloxane polycarbonate copolymers can be made by reaction of a bisphenol, or mixture of bisphenols, with a carbonyl precursor, such as phosgene, triphosgene, diaryl or dialkyl carbonates, wherein a portion of the bisphenol has been replaced by a functional siloxane capable of reaction with the carbonyl precursor, for instance a siloxane bisphenol of Formula XVIII wherein g is an integer from 1 to about 100, optionally from about 5 to about 50, n is an integer from 1 to 4, R is at least one of an aryl, alkyl, aryl alky, alkoxy or halogen group and R' is an aryl, alkyl or aryl alky group of from 2 to 20 carbon atoms.

Formula XVIII

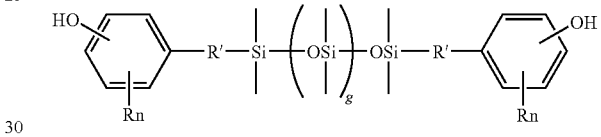

In other instances the siloxane polycarbonate copolymer can be made by reaction of a bisphenol, or mixture of bisphenols, with a carbonyl precursor, such as phosgene, diaryl or dialkyl carbonates, wherein a portion of the bisphenol has been replaced by a functional siloxane, for example a siloxane bisphenol, capable of reaction with the carbonyl precursor. For example a siloxane bisphenol of Formula XIX, wherein g is defined as above and Ar is an aryl group derived from a dihydroxy substituted aromatic hydrocarbon.

Formula XIX

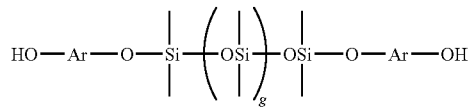

In other embodiments siloxane polyester carbonates can be made by reaction of a bisphenol, or mixture of bisphenols, with mixtures of carbonyl precursors, such as phosgene, diaryl or dialkyl carbonates, with dicarboxylic acid dichlorides wherein a portion of the bisphenol has been replaced by a functional siloxane capable of reaction with the carbonyl precursor, for instance a siloxane bisphenol of Formulas XVIII or XIX.

In other embodiments the siloxane copolymer may be a copolymer of a polysulfone, polyether sulfones or polyphenylene ether sulfone containing siloxane groups as part of the polymer chains. These siloxane polysulfone copolymers may be made by reaction of aryl sulfone containing oligomers with functionalized polysiloxanes to form random or block copolymers. Examples of siloxane polysulfone and siloxane polyethersulfones are disclosed in U.S. Pat. Nos. 4,443,581, 3,539,657, 3,539,655 and 3,539,655.

The siloxane copolymer can be a random or block copolymer containing siloxane and aryl polyether segments, for instance copolymers of 2,6-xylenol bonded siloxanes polymer segments. Examples of siloxane polyarylether copolymers are disclosed in U.S. Pat. Nos. 6,339,131, 5,357,022, 4,814,392 and 3,668,273.

The resorcinol derived polyarylate and polyester carbonate resin siloxane copolymer mixtures of the invention can be further blended with other thermoplastic resins. Examples of other thermoplastic resins are polysulfones, polyphenylene ethers, polyetherimides, polysulfone etherimides, as well as polycarbonates, polyarylates and polyester carbonates that are essentially free of resorcinol linkages. Essentially free of resorcinol as used in this instance is a polycarbonate, polyarylate or polyester carbonate resin having less than 1 mole % resorcinol derived linkages. Examples of polycarbonates essentially free of resorcinol linkages are polycarbonates derived from reaction of a carbonyl precursor with bisphenols, or mixtures of more than one bisphenol, for example polycarbonates derived from; bisphenol A, tetra methyl bisphenol A, isophorone bisphenol A, dihydroxy diphenyl sulfone, hydroxy diphenyl ether, tetra bromo bisphenol A, biphenol, hydroquinone, methylene bis phenol, phenyl dialkylidene bisphenols, fluorenone bisphenol, phenyl methyl bisphenol, spiro biindane bisphenol and the like. Examples of carbonate precursors are carbonyl precursors, such as phosgene, triphosgene, diaryl or dialkyl carbonates. Examples of polyarylates are resins made from reaction of dicarboxylic acids chlorides, such as iso and tere phthaloyl chloride, or mixtures thereof, with bisphenols, for example those listed above. Examples of polyester carbonate copolymers are resins than can be made by reaction of a bisphenol, or mixture of bisphenols, with mixtures of carbonyl precursors, such as phosgene, triphosgene, diaryl or dialkyl carbonates, with dicarboxylic acid dichlorides. In some blends the resorcinol derived polyarylate or polyester carbonate may be present from 10 to 95% by weight of the entire mixture, with 0.1 to 10 wt. % siloxane copolymer and from 5 to 90 wt. % of the non-resorcinol containing polycarbonate, polyarylate, polyester carbonate or mixture thereof.

The mixtures of siloxane copolymers and resorcinol derived polyarylate resins can be further blended with rubbery impact modifiers such as: polyolefins, including copolymers such as ethylene ethyl acrylates, core shell rubber modifiers such as acrylic rubbers and methylmethacrylate butadiene styrene (MBS), for example as described in U.S. Pat. No. 6,545,089, graft rubbers such as acrylonitrile butadiene styrene (ABS), block copolymers such as styrene butadiene styrene (SBS), and styrene ethylene butylene styrene (SEBS) copolymers, polyether ester block copolymers and mixtures thereof. In some embodiments low levels of such modifiers, 0.5 to 7% by weight of the entire composition, may be used to provide further improvement in impact. Lower levels, for example 0.5 to 7 wt %, of these combustible rubbery modifiers may be desired to balance improved impact with reduced flammability. High levels of rubber, greater than about 10%, may provide too much fuel reducing flame retardance effectiveness in some instances.

The high Izod impact strength and high tensile elongation of the resorcinol-based aryl polyester and siloxane copolymer compositions make them useful for applications, such as sheets, where they show resistance to damage by impact. The combination of toughness and impact with flame resistance, as shown in a low heat release values, make sheets or other articles formed from these compositions very useful. For example such sheets can be used for the construction of vehicles for transportation, for instance aircraft, cruise ships or train interiors. Sheets can be used as prepared, for example by extrusion, compression molding or calendering and can be thermoformed or shaped by other methods. Films and sheets can also be components in more complex multilayer or foam constructions. Good impact is shown, in some instances by having a tensile elongation at break, for example, as measured by ASTM method D638, of greater than or equal to about 50%, or in other instances of having a notched Izod impact value, as measured by ASTM method D256, of greater than or equal to 5.0 ft-lbs/in. In still other embodiments the composition, and articles made from it, will have both a tensile elongation at break of greater than about 50% and a notched Izod impact of greater than about 5.0 ft-lbs/in.

Metal oxides may also be added to all the blends of siloxane copolymers and resorcinol ester containing polymers. Metal oxides include, for example; titanium dioxides, zinc oxides, boron oxides, antimony oxides, iron oxides and transition metal oxides. Metal oxides that are white may be desired in some instances. Metal oxides may be used alone or in combination with other metal oxides. Metal oxides may be used in any effective amount, in some instances at from 0.01 to 20 wt. % of the polymer blend. The metal oxides can also contain siloxane atoms.

Other useful additives include smoke suppressants such as metal borate salts, for example, zinc borate, alkali metal or alkaline earth metal borate or other borate salts. Additionally other boron containing compounds, such as boric acid, borate esters, boron oxides or other oxygen compounds of boron may be useful. Conventional flame retardant additives, for example, phosphate esters, sulfonate salts and halogenated aromatic compounds may also be employed. Mixtures of any or all of these flame retardants may also be used. Examples of halogenated aromatic compounds are brominated phenoxy resins, halogenated polystyrenes, halogenated imides, brominated polycarbonates, brominated epoxy resins and mixtures thereof. Examples of sulfonate salts are potassium perfluoro butyl sulfonate, sodium tosylate, sodium benzene sulfonate, sodium dichloro benzene sulfonate, potassium diphenyl sulfone sulfonate and sodium methane sulfonate. In some instances sulfonate salts of alkaline and alkaline earth metals are preferred. Examples of phosphate flame retardants are tri aryl phosphates, tri cresyl phosphate, triphenyl phosphate, bisphenol A phenyl diphosphates, resorcinol phenyl diphosphates, phenyl-bis-(3,5,5'-trimethylhexyl phosphate), ethyl diphenyl phosphate, bis(2-ethylhexyl)-p-tolyl phosphate, bis (2-ethylhexyl)-phenyl phosphate, tri(nonylphenyl)phosphate, phenyl methyl hydrogen phosphate, di(dodecyl)-p-tolyl phosphate, halogenated triphenyl phosphates, dibutyl phenyl phosphate, 2-chloroethyldiphenyl phosphate, p-tolyl bis(2,5,5'-trimethylhexyl) phosphate, 2-ethylhexyldiphenyl phosphate, diphenyl hydrogen phosphate, resorcinol diphosphate and the like.

In some instances it may be desirable to have flame retardant compositions that are essentially free of halogen atoms, especially bromine and chlorine. Essentially free of halogen atoms means the composition has less than 3% halogen by weight of the composition. In other embodiments the compositions have less than 1% halogen by weight. The amount of halogen atoms can be determined by ordinary chemical analysis.

The composition can optionally include a fluoropolymer in any effective amount to provide anti-drip or other improved properties to the resin composition. In some instances the fluoro polymer may be used in an amount of 0.01 to about 5.0% fluoropolymer by weight of the composition. Some possible examples of suitable fluoropolymers and methods for making such fluoropolymers are set forth, for example, in U.S. Pat. Nos. 3,671,487, 3,723,373 and 3,383,092. Suitable fluoropolymers include homopolymers and copolymers that comprise structural units derived from one or more fluorinated alpha-olefin monomers. The term "fluorinated alpha-olefin monomer" means an alpha-olefin monomer that includes at least one fluorine atom substituent. Some of the suitable fluorinated alpha-olefin monomers include, for example, fluoro ethylenes such as, for example, $CF_2=CF_2$, $CHF=CF_2$, $CH_2=CF_2$ and $CH_2=CHF$ and fluoro propylenes such as, for example, $CF_3CF=CF_2$, $CF_3CF=CHF$, $CF_3CH=CF_2$, $CF_3CH=CH_2$, $CF_3CF=CHF$, $CHF_2CH=CHF$ and $CF_3CF=CH_2$.

Some of the suitable fluorinated alpha-olefin copolymers include copolymers comprising structural units derived from two or more fluorinated alpha-olefin monomers such as, for example, poly(tetrafluoro ethylene-hexafluoro ethylene), and copolymers comprising structural units derived from one or more fluorinated monomers and one or more non-fluorinated monoethylenically unsaturated monomers that are copolymerizable with the fluorinated monomers such as, for example, poly(tetrafluoroethylene-ethylene-propylene) copolymers. Suitable non-fluorinated monoethylenically unsaturated monomers include for example, alpha-olefin monomers such as, for example, ethylene, propylene, butene, acrylate monomers such as for example, methyl methacrylate, butyl acrylate, and the like, with poly(tetrafluoroethylene) homopolymer (PTFE) preferred.

The blends may further contain fillers and reinforcements such as fiber glass, milled glass, glass beads, flake and the like. Minerals such as talc, wollastonite, mica, kaolin or montmorillonite clay, silica, quartz and barite may be added. The compositions can also be modified with effective amounts of inorganic fillers, such as, for example, carbon fibers and nanotubes, metal fibers, ceramic fibers, metal powders, conductive carbon, and other additives including nanoscale reinforcements. Long glass fibers or continuous glass fibers may also be used in combination with the blends disclosed herein. In some embodiments the flame retardant blends will be used with fiber glass to make sheets, including foamed sheets.

Other additives include, antioxidants such as phosphites, phosphonites and hindered phenols. Phosphorus containing stabilizers include triaryl phosphite, aryl phosphonates as well as difunctional phosphorus containing compounds. Phosphorus containing stabilizers are typically present in the composition at 0.05 to about 0.5% by weight of the entire formulation. Colorants, light stabilizers, optical brighteners, UV absorbers, flow aids and mold release compounds are also contemplated. Examples of mold release agents are alkyl carboxylic acid esters, for example, pentaerythritol tetrastearate, glycerin tristearate and ethylene glycol distearate. Mold release agents are typically present in the composition at 0.05 to about 0.5% by weight of the formulation.

The compositions of the present invention can be blended with the aforementioned ingredients by a variety of methods involving intimate admixing of the materials with any additional additives desired in the formulation. A preferred procedure includes melt blending, although solution blending is also possible. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 250° C. and about 310° C. in the molten resin composition, although higher temperatures can be used provided that the residence time of the resin in the processing equipment is kept short. In some embodiments the melt processed composition exits processing equipment such as an extruder through small exit holes in a die, and the resulting strands of molten resin are cooled by passing the strands through a water bath. The cooled strands can be chopped into small pellets for packaging and further handling.

The compositions of the invention can be formed into articles by any number of methods. Examples of suitable methods include melt processing, for example, injection molding, blow molding, compression molding, profile extrusion, sheet or film extrusion, gas assist molding, structural foam molding and thermoforming. Examples of such articles include, but are not limited to, cookware, food service items, medical devices, trays, plates, handles, helmets, animal cages, electrical connectors, enclosures for electrical equipment, engine parts, automotive engine parts, lighting sockets and reflectors, electric motor parts, power distribution equipment, communication equipment, computers and the like, including devices that have molded in snap fit connectors. Other articles include, for example, sheets, films, multilayer sheets, multilayer films, molded parts, extruded profiles, coated parts, fibers and foams: windows, luggage racks, wall panels, chair parts, lighting panels, diffusers, shades, partitions, lenses, skylights, lighting devices, reflectors, ductwork, cable trays, conduits, pipes, cable ties, wire coatings, electrical connectors, air handling devices, ventilators, louvers, insulation, bins, storage containers, doors, hinges, handles, sinks, mirror housing, mirrors, toilet seats, hangers, coat hooks, shelving, ladders, hand rails, steps, carts, trays, cookware, food service equipment, communications equipment and instrument panels. Articles of different types can be used for transport devices, especially transport devices used to carry people, such as aircraft, trains, buses, ships and the like. In some instances it can be desirable to have articles that are clear, in some instances having a percent transmittance of greater than 50%. In other instances articles with a percent haze below 25% can be of note.

Compositions discussed herein can be converted to articles using common thermoplastic processes such as film and sheet extrusion. Film and sheet extrusion processes can include and are not limited to melt casting, blown film extrusion and calendering. Co-extrusion and lamination processes can be employed to form composite multi-layer films or sheets. Single or multiple layers of coatings can further be applied to the single or multi-layer substrates to impart additional properties such as scratch resistance, ultra violet light resistance, aesthetic appeal, etc. Coatings can be applied through standard application techniques such as rolling, spraying, dipping, brushing, or flow coating. Film and sheet can alternatively be prepared by casting a solution or suspension of the composition in a suitable solvent onto a substrate, belt or roll followed by removal of the solvent. Films can also be metalized using standard processes such as sputtering, vacuum deposition and lamination with foil.

Oriented films can be prepared through blown film extrusion or by stretching cast or calendered films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

The films and sheets described above can further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as described below:

1) Providing a single or multi-layer thermoplastic substrate having optionally one or more colors on the surface, for instance, using screen printing of a transfer dye;
2) Conforming the substrate to a mold configuration such as by forming and trimming a substrate into a three dimensional shape and fitting the substrate into a mold having a surface which matches the three dimensional shape of the substrate; or
3) Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including but not limited to heat-setting, texturing, embossing, corona treatment, flame treatment, plasma treatment and vacuum deposition may further be applied to the above articles to alter surface appearances and impart additional functionalities to the articles. Accordingly, another embodiment of the invention relates to articles, sheets and films prepared from the compositions above.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner.

All patents cited herein are incorporated by reference.

EXAMPLES

Blends were prepared by extrusion of mixtures of resorcinol-based polyester carbonate resin with a siloxane polyetherimide (siloxane PEI) or siloxane polycarbonate (siloxane PC) copolymer resin or other ingredients as mentioned in the tables 1 to 4, in a 2.5 inch single screw, vacuum vented extruder. Compositions are listed in wt % of the total composition except where noted otherwise. The extruder was set at about 250 to 310° C. The blends were run at about 90 rpm under vacuum. The extrudate was cooled, pelletized and dried at 120° C. Test samples were injection molded at a set temperature of 280-310° C. and mold temperature of 120° C. using a 30 second cycle time. Properties were measured using ASTM test methods. Melt flow index (MFI) was run on dried pellets as per ASTM D1238 at 295° C. using a 6.6 Kg weight, or at 300° C. using a 1.2 Kg weight, as noted. All molded samples were conditioned for at least 48 h at 50% relative humidity prior to testing. Notched Izod impact values were measured at room temperature on 3.1 mm thick bars as per ASTM D256. Heat distortion temperature (HDT) was measured at 1.82 MPa (264 psi) on 3.1 mm thick bars as per ASTM D648. Biaxial impact, sometimes called instrumented impact, was measured on 102×3.1 mm discs at 23° C. using ASTM method D3763, total impact energy is reported. Tensile properties were measured on 3.1 mm type I bars as per ASTM method D638. Tensile strength is reported at yield (Y), percent elongation (% Elong.) is reported at break (B). Percent transmittance (% T) and percent Haze (% H) were measured at 3.1 mm using ASTM method D1003. Heat release testing was done on 15.2×15.2 cm plaques 2.0 mm thick using the Ohio State University (OSU) rate-of-heat release apparatus, as measured by the method listed in FAR 25.853. Heat release was measured at two-minutes in KW-min/m$^2$ (kilowatt minutes per square meter). Peak heat release was measured as kW/m$^2$ (kilowatts per square meter). The heat release test method is also described in the "Aircraft Materials Fire Test Handbook" DOT/FAA/AR-00/12, Chapter 5 "Heat Release Test for Cabin Materials".

Note that letters designate comparative examples while numbers designate examples of the invention.

Materials

ITR resins are polymers made from the condensation of a 1:1 mixture of iso and terephthaloyl chloride with resorcinol, and subsequent reaction with bisphenol A (BPA) and phosgene. The polymers are named by the approximate mole ratio of ester linkages to carbonate linkages.

ITR9010: about 81 mole % resorcinol ester linkages, 8 mole % resorcinol carbonate linkages and about 11 mole % BPA carbonate linkages. Tg=131° C.

ITR6040: about 51 mole % resorcinol ester linkages, 15 mole % resorcinol carbonate linkages and about 34 mole % BPA carbonate linkages. Tg=125° C.

ITR4060: about 34 mole % resorcinol ester linkages, 6 mole % resorcinol carbonate linkages and about 60 mole % BPA carbonate linkages. Tg=130° C.

ITR2080: about 19 mole % resorcinol ester linkages, 6 mole % resorcinol carbonate linkages and about 75 mole % BPA carbonate linkages. Tg=136° C.

Siloxane PEI is a polyetherimide dimethyl siloxane copolymer made from the imidization reaction of m-phenylene diamine, BPA-dianhydride and a bis-aminopropyl functional methyl siloxane containing on average about 10 siloxane atoms. It has about 34 wt % siloxane content and a Mw of about 24,000 as measured by gel permeation chromatography.

Siloxane PC is a copolymer of BPA polycarbonate with 20 wt % of a eugenol propyl capped dimethyl siloxane with a siloxane block length of about 45 siloxane atoms, copolymer Mw is about 30,000.

PC is BPA polycarbonate, LEXAN 130 from General Electric Plastics, Mw about 36,500.

PCE is BPA copolyester carbonate containing about 60 wt % of a 1:1 mixture iso and tere phthalate ester groups and the remainder BPA carbonate groups, Mw is about 28,300.

Examples A, 1-6

Table 1 shows blends of an ITR copolymer resin having about 90 mole % resorcinol ester containing linkages combined with a siloxane polyetherimide. As can be seen in examples 1 to 6 addition of the siloxane PEI, even at very low levels, gives a surprising reduction in two-minute and peak heat release compared to the control example A. With only 1.0 wt % siloxane PEI the peak heat release in example 5 is reduced by about 45% from 85 to 47 KW/m$^2$. Note that the blends also retain modulus, strength and elongation. With low levels of siloxane PEI, the blends also are transparent (% T>50).

TABLE 1

| | Examples | | | | | | |
|---|---|---|---|---|---|---|---|
| | A | 1 | 2 | 3 | 4 | 5 | 6 |
| ITR9010 | 99.94 | 99.84 | 99.74 | 99.54 | 99.45 | 98.95 | 98.45 |
| PEI-Siloxane | 0.0 | 0.1 | 0.2 | 0.4 | 0.5 | 1.0 | 1.5 |
| aryl phosphite | 0.06 | 0.06 | 0.06 | 0.06 | 0.05 | 0.05 | 0.05 |
| Heat Release | | | | | | | |
| 2 min (KW-min/m$^2$) | 36 | 34 | 31 | 27 | 20 | 24 | 26 |
| Peak (KW/m$^2$) | 85 | 70 | 60 | 58 | 47 | 47 | 34 |
| MFR@300° C. | 12.4 | 11.9 | 11.5 | 11.4 | 13.4 | 13.7 | 13.6 |
| Flex Mod Kpsi | 344 | 340 | 348 | 360 | 369 | 372 | 373 |
| Flex Str. Kpsi | 16.2 | 16.1 | 16.5 | 16.8 | 16.8 | 16.7 | 16.8 |
| T Str. (Y) Kpsi | 11.0 | 11.0 | 11.0 | 11.0 | 10.8 | 10.8 | 10.8 |
| % Elong (B) | 110 | 95 | 120 | 100 | 110 | 100 | 100 |
| HDT @264 psi ° C. | 117 | 119 | 119 | 119 | 118 | 118 | 118 |
| Biaxial impact: | | | | | | | |
| Total energy ft-lbs | 60.9 | 63.5 | 63.0 | 60.3 | 62.2 | 58.1 | 56.6 |
| N Izod ft-lbs/in | 4.3 | 9.7 | 5.2 | 5.1 | 4.6 | 4.5 | 4.2 |
| % T @ 3.1 mm | 86.8 | 86.7 | 85.5 | 82.0 | 78.0 | 66.2 | 55.6 |
| % Haze | 0.8 | 0.6 | 0.8 | 2.2 | 3.8 | 12.9 | 28.1 |

Examples B-D, 7-9

Table 2 shows a series of ITR copolymers, where the resorcinol ester content (RMC) varies from about 60 to 20 mole %, blended with 2 wt % siloxane PEI. The copolymers with no siloxane PEI resin are shown as control examples (B, C, D). Note that the siloxane PEI is effective in reducing two minute and peak heat release values in all cases (examples 7, 8 and 9) compared to the ITR copolymers with no added siloxane copolymer. Also note the high notched Izod impact strength of the siloxane PEI blends. These examples also show that a higher resorcinol ester content (RMC) is more effective in reducing heat release values than a lower RMC. Blends with greater than about 40 mole % RMC have low two minute heat release (below 75 KW-min/m$^2$) and low peak heat release values (below 80 KW/m$^2$).

TABLE 2

| | Examples | | | | | |
|---|---|---|---|---|---|---|
| | B | 7 | C | 8 | D | 9 |
| ITR6040 | 100 | 98 | 0 | 0 | 0 | 0 |
| ITR4060 | 0 | 0 | 100 | 98 | 0 | 0 |
| ITR2080 | 0 | 0 | 0 | 0 | 100 | 98 |
| PEI-Siloxane | 0 | 2 | 0 | 2 | 0 | 2 |
| Heat Release | | | | | | |
| 2 min (KW-min/m$^2$) | 75 | 59 | 93 | 70 | 115 | 105 |
| Peak (KW/m$^2$) | 101 | 78 | 117 | 77 | 171 | 122 |
| MFR@300° C. | 5.8 | 5.4 | 8.6 | 8.4 | 7.6 | 7.3 |
| Flex Mod Kpsi | 367 | 358 | 364 | 354 | 354 | 348 |
| Flex Str Kpsi | 15.8 | 15.8 | 15.5 | 15.5 | 14.7 | 14.5 |
| T Str. (Y) Kpsi | 10.2 | 10.1 | 9.9 | 9.9 | 9.3 | 9.2 |
| % Elong (B) | 83 | 94 | 110 | 120 | 130 | 130 |
| HDT 264 psi ° C. | 118 | 118 | 119 | 118 | 124 | 123 |
| Biaxial impact: | | | | | | |
| Total energy ft-lbs | 59.2 | 61.8 | 57.7 | 56.9 | 58.1 | 58.1 |
| N Izod ft-lbs/in | 6.7 | 15.5 | 4.0 | 14.6 | 16.2 | 16.2 |

Note that examples, 7 to 9 and B to D, all have 3.0 phr (parts per hundred) titanium dioxide and 0.1 phr of a tri-aryl phosphite present and are opaque by virtue of the added TiO$_2$ pigment.

Examples 10-14

Table 3 shows blends of ITR9010 with higher levels (2 to 4 wt. %) of siloxane PEI. Examples 10 to 12 again show low two minute and low peak heat release values both with and without added TiO$_2$. Examples 13 and 14 show ITR9010 blends with 5 wt. % of a siloxane polycarbonate copolymer also having reduced peak heat release values compared to example A in table 1 (where there is no added siloxane PC copolymer).

TABLE 3

| | Examples | | | | |
|---|---|---|---|---|---|
| | 10 | 11 | 12 | 13 | 14 |
| ITR9010 | 95 | 96 | 93 | 95 | 92 |
| PEI-Siloxane | 2 | 4 | 4 | 0 | 0 |
| PC-Siloxane | 0 | 0 | 0 | 5 | 5 |
| TiO$_2$ | 3 | 0 | 3 | 0 | 3 |
| Heat Release | | | | | |
| 2 min (KW-min/m$^2$) | 25 | 35 | 29 | 39 | 46 |
| Peak (KW/m$^2$) | 37 | 49 | 44 | 56 | 62 |

Examples E-F, 15-16

Table 4 shows examples of flame retardant blends containing ITR copolymer with siloxane PEI further comprising polycarbonate (PC), example 15, or a non-resorcinol containing polyester carbonate (PCE), example 16. The ITR containing blends, even with only 30 wt. % ITR9010 added, show reduced heat relase value vs. controls E and F with no resorcinol ester containing copolymer. All blends in table 4 had 3.0 phr titanium dioxide and 0.5 phr of a triaryl phosphite.

TABLE 4

|  | Examples | | | |
| --- | --- | --- | --- | --- |
|  | E | 15 | F | 16 |
| PC 130 | 98 | 68 | 0 | 0 |
| PCE | 0 | 0 | 98 | 68 |
| Siltem | 2 | 2 | 2 | 2 |
| ITR9010 | 0 | 30 | 0 | 30 |
| TiO2 (phr) | 3 | 3 | 3 | 3 |
| Heat Release | | | | |
| 2 min (KWmin/m$^2$) | 59 | 50 | 49 | 44 |
| Peak (KW/m$^2$) | 97 | 66 | 72 | 62 |
| MFR@295° C. | 12.6 | 14.4 | 6.9 | 10.7 |
| Flex Mod Kpsi | 338 | 354 | 329 | 350 |
| Flex Str Kpsi | 14.3 | 15.4 | 15.0 | 16.0 |
| T Str. (Y) Kpsi | 8.8 | 9.5 | 9.1 | 9.9 |
| % Elong (B) | 83 | 95 | 83 | 88 |
| HDT 264 psi ° C. | 135 | 132 | 149 | 137 |
| Biaxial impact | | | | |
| E Max load ft-lbs | 52.7 | 59.2 | 44.6 | 50.8 |
| N Izod ft-lbs/in | 16.0 | 16.0 | 7.6 | 10.4 |

We claim:

1. A composition comprising a resorcinol-based aryl polyester resin having greater than or equal to 40 mole % of its moieties derived from resorcinol and a siloxane copolymer, wherein the composition has a peak heat release, as measured by FAR 25.853, of less than 65 kW/m$^2$, wherein the total content of all siloxane copolymers in the composition is from 0.1 to 9.0 weight percent based on the total weight of the composition, and wherein the composition has a tensile elongation at break, as measured by ASTM D638, of greater than or equal to 50%, and a notched Izod impact, as measured by ASTM method D256 of greater than or equal to 5.0 ft-lbs/in.

2. The composition of claim 1 wherein the composition has a percent transmittance at 3.1 mm, as measured by ASTM D1003, of greater than or equal to 50 percent.

3. The composition of claim 1 wherein the total siloxane block weight of the composition based on the total weight of the composition is from 0.02 to 1.8 weight percent.

4. The composition of claim 1 wherein the total content of all siloxane copolymers in the composition is from 0.1 to 5.0 weight percent based on the total weight of the composition.

5. The composition of claim 1 wherein the resorcinol-based aryl polyester resin has a hydrogen atom to carbon atom ratio of less than or equal to 0.75:1.

6. The composition of claim 1 wherein the siloxane copolymer is selected from the group consisting of polyimide siloxanes, polyetherimide siloxanes, polyetherimide sulfone siloxanes, polysulfone siloxanes, polyether sulfone siloxanes, polyphenylene ether sulfone siloxanes, and polyphenylene ether siloxanes.

7. The composition of claim 6 wherein the siloxane copolymer is selected from the group consisting of polyimide siloxanes, polyetherimide siloxanes, and polyetherimide sulfone siloxanes.

8. The composition of claim 1 wherein the total siloxane block weight of the composition based on the total weight of the siloxane copolymer is from 5 to 70 weight percent.

9. The composition of claim 1 wherein the resorcinol-based aryl polyester has the structure shown below:

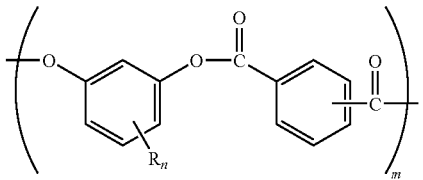

wherein R is at least one of $C_{1-12}$ alkyl, $C_6$-$C_{24}$ aryl, alkyl aryl, alkoxy or halogen, n is 0 to 4 and m is on average at least 8.

10. The composition of claim 1 wherein resorcinol-based aryl polyester has the structure shown below:

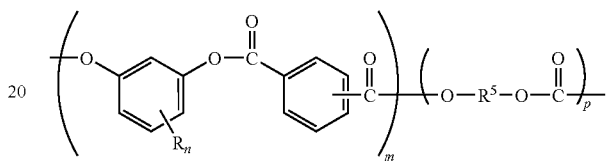

wherein R is at least one of $C_{1-12}$ alkyl, $C_6$-$C_{24}$ aryl, alkyl aryl, alkoxy or halogen, n is 0 to 4, $R^5$ is at least one divalent organic radical, m is on average from 4 to 150, and p is on average from 2 to 200.

11. The composition of claim 10 wherein $R^5$ is a moiety derived from a bisphenol compound.

12. The composition of claim 1 wherein the composition has a haze at 3.1 mm, as measured by ASTM D1003, of less than or equal to 25 percent.

13. The composition of claim 1 further comprising a fluoropolymer.

14. The composition of claim 1 further comprising a second resorcinol-based polyester resin.

15. The composition of claim 1 wherein the composition has a melt flow, as measured by ASTM method D1238 at 300° C. with a 1.2 Kg weight, of from 1 to 30 g/10 min.

16. A composition comprising a resorcinol-based aryl polyester resin having greater than or equal to 40 mole % of its moieties derived from resorcinol and a siloxane copolymer, wherein the composition has a peak heat release, as measured by FAR 25.853, of less than 80 kW/m$^2$, and wherein the composition has a percent transmittance at 3.1 mm, as measured by ASTM D1003, of greater than or equal to 50 percent, wherein the total content of all siloxane copolymers in the composition is from 0.1 to 9.0 weight percent based on the total weight of the composition, and wherein the composition has a tensile elongation at break, as measured by ASTM D638, of greater than or equal to 50%, and a notched Izod impact, as measured by ASTM method D256 of greater than or equal to 5.0 ft-lbs/in.

17. A composition comprising at least one resorcinol-based aryl polyester resin having greater than or equal to 40 mole % of its moieties derived from resorcinol and at least one siloxane copolymer, wherein the composition has a peak heat release, as measured by FAR 25.853, of less than 80 kW/m$^2$ and wherein the siloxane copolymer is selected from the group consisting of polyimide siloxanes, polyetherimide siloxanes, polyetherimide sulfone siloxanes, polysulfone siloxanes, polyether sulfone siloxanes, polyphenylene ether sulfone siloxanes, and polyphenylene ether siloxanes, and wherein the composition does not comprise a polycarbonate siloxane, wherein the total content of all siloxane copolymers in the composition is from 0.1 to 9.0 weight percent based on the total weight of the composition, and wherein the composition has a tensile elongation at break, as measured by ASTM D638, of greater than or equal to 50%, and a notched Izod impact, as measured by ASTM method D256 of greater than or equal to 5.0 ft-lbs/in.

18. A composition comprising at least one resorcinol-based aryl polyester resin having greater than or equal to 40 mole % of its moieties derived from resorcinol and from 0.1 to 5.0 wt % based on the total weight of the composition of at least one siloxane copolymer, wherein the composition has a peak heat release, as measured by FAR 25.853, of less than 65 kW/m$^2$, and wherein the composition has a percent transmittance at 3.1 mm, as measured by ASTM D1003, of greater than or equal to 50 percent, and wherein the resorcinol-based aryl polyester resin has a hydrogen atom to carbon atom ratio of less than or equal to 0.75:1, wherein the total content of all siloxane copolymers in the composition is from 0.1 to 9.0 weight percent based on the total weight of the composition, and wherein the composition has a tensile elongation at break, as measured by ASTM D638, of greater than or equal to 50%, and a notched Izod impact, as measured by ASTM method D256 of greater than or equal to 5.0 ft-lbs/in.

19. An article comprising the composition of claim 1.
20. An article comprising the composition of claim 16.
21. An article comprising the composition of claim 17.

* * * * *

UNITED STATES PATENT AND TRADEMARK OFFICE
CERTIFICATE OF CORRECTION

PATENT NO. : 7,652,107 B2  Page 1 of 1
APPLICATION NO. : 11/263493
DATED : January 26, 2010
INVENTOR(S) : Gallucci et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 596 days.

Signed and Sealed this

Twenty-third Day of November, 2010

David J. Kappos
*Director of the United States Patent and Trademark Office*